(12) United States Patent
Shimada

(10) Patent No.: US 6,804,268 B1
(45) Date of Patent: Oct. 12, 2004

(54) METHOD AND APPARATUS FOR MULTI-ACCESS TRANSMISSION

(75) Inventor: Naohiro Shimada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/488,516

(22) Filed: Jan. 21, 2000

(30) Foreign Application Priority Data

Jan. 22, 1999 (JP) ............................................. 11-013796

(51) Int. Cl.[7] .............................. H04L 12/26; H04J 1/16; G08C 15/00; G06F 11/00
(52) U.S. Cl. ........................ 370/535; 370/223; 370/397; 370/446; 370/539
(58) Field of Search ................................. 370/360, 375, 370/376, 388, 389, 470, 532, 535, 536, 538, 222, 223, 226, 228; 359/110, 135, 139, 161

(56) References Cited

U.S. PATENT DOCUMENTS

| | | | | | |
|---|---|---|---|---|---|
| 5,311,501 | A | * | 5/1994 | Takatsu | 370/357 |
| 5,517,489 | A | * | 5/1996 | Ogura | 370/223 |
| 5,583,855 | A | * | 12/1996 | Ball | 370/376 |
| 5,745,476 | A | * | 4/1998 | Chaudhuri | 370/222 |
| 5,754,545 | A | * | 5/1998 | Shinbashi et al. | 370/360 |
| 5,805,568 | A | * | 9/1998 | Shinbashi | 370/223 |
| 5,815,490 | A | * | 9/1998 | Lu | 370/223 |
| 5,859,846 | A | * | 1/1999 | Kim et al. | 370/389 |
| 5,896,378 | A | * | 4/1999 | Barker | 370/384 |
| 6,094,442 | A | * | 7/2000 | Okamoto et al. | 370/506 |
| 6,148,001 | A | * | 11/2000 | Soirinsuo et al. | 370/420 |
| 6,317,414 | B1 | * | 11/2001 | Naohiro | 370/222 |
| 6,496,518 | B1 | * | 12/2002 | Taniguchi | 370/465 |

FOREIGN PATENT DOCUMENTS

| | | |
|---|---|---|
| JP | 7-170238 | 7/1995 |
| JP | 8-8949 | 1/1996 |
| JP | 9-511624 | 11/1997 |
| JP | 10-224390 | 8/1998 |

\* cited by examiner

*Primary Examiner*—Man Phan
(74) *Attorney, Agent, or Firm*—McGinn & Gibb, PLLC

(57) ABSTRACT

A multi-access transmission method for effectively and efficiently utilizing bands of a synchronous digital hierarchy (SDH) path. The method has the steps of extracting a synchronous digital hierarchy path from signals input from a first point, recognizing all packets or cells input from the first point to select and drop a packet or cell to be dropped at a second point, multiplexing packets or cells not dropped and a packet or cell to be inserted at the second point at a packet or cell level, and sending signals created at the multiplexing step to a third point. With this method, packets or cells are multiplexed in a synchronous digital hierarchy path to share one synchronous digital hierarchy path among a plurality of communications.

23 Claims, 7 Drawing Sheets

METHOD AND APPARATUS FOR MULTI-ACCESS TRANSMISSION

BACKGROUND OF THE INVENTION

1. Field of the Invention

The present invention relates to a multi-access transmission method and multi-access transmission apparatus for use in an SDH (Synchronous Digital Hierarchy) communication network.

2. Description of the Prior Art

In these days, communication traffic is increased on the Internet, and communication providers or ISPs (Internet Service Providers) face a significant problem that how the increased traffic is incorporated into existing networks.

Most of the communication traffic on the Internet is non-voice data and has burst traffic patterns. In other words, it is rarely that actual communication always occupies allocated bands on a communication line used. Nevertheless, existing networks (for example, point-to-point dedicated lines) are currently used, and thus bands can not be necessarily used efficiently. As a result, a secondary problem occurs that the cost of communication paths is high.

Most of data transferred on the Internet is important data for commercial use. High reliability and quality as well as reduced cost are required for transmission networks. In addition, with a recent wider variety of services, requirements for reliability and quality vary among services. Furthermore, demand grows for application to WANs (Wide Area Networks) establishing connection among LANs (Local Area Networks) and for broadcast or multicast.

With these demands as a background, the aforementioned requirements are difficult to sufficiently meet with techniques for transmission networks or LANs typified by a conventional synchronous digital hierarchy.

When the conventional networks are used for connection among LANs, as shown in FIG. 1A, connections between respective sites require that SDH paths 120 are provided in a mesh type point-to-point form. This method provides individual dedicated lines shown as bold lines in FIG. 1 between respective points, i.e. between A point and B point, A point and C point, A point and D point, B point and C point, B point and D point, and C point and D point. This requires a significant number of SDH paths (that is, dedicated lines).

Another method exists for providing SDH paths in a hop-by-hop type point-to-point form as shown in FIG. 1B. The method provides SDH paths (dedicated lines) 121 between respective points, i.e. between E–F, F–G, G–H, and H–E and arranges routers for routing at respective points of E, F, G and H. For example, when data is transmitted from E point to G point, the data is once transmitted from E point to F point and then from F point to G point with outing at F point. In such a transmission form, SDH paths 121 are sectioned at respective nodes to complicate the management of SDH paths 121.

In this manner, in the conventional transmission system for connection among LANs shown in FIGS. 1A and 1B, since the SDH paths are connected in a point-to-point form and one SDH path is allocated to one communication path, bands of an SDH path are always occupied by a single communication path whether or not all of the bands of the SDH path are used for actual communication. For example, when communication is performed connecting A point to B point as shown in FIG. 2, SDH path 40 connecting A point to B point is provided and occupied by communication between A–B points in a conventional transmission apparatus. As a result, the bands of SDH path 40 are always provided for communication between A–B points. No problem occurs when all the bands of SDH path 40 are used for communication between A–B points. However, some unused bands, if any, could not be effectively used. Therefore, more bands are required for one communication path, resulting in inability to efficiently use potential bands of a transmission line and to provide an inexpensive communication line in terms of cost.

Additionally, conventional LAN techniques have problems such as difficulty of rapid recovery from faults, and do not necessarily provide a network with high reliability and quality. Solutions for application to wide area networks (WANs), and for broadcast and multicast are also not sufficient.

In JP, A, 07-170238, proposed is an add/drop multiplexer apparatus for exchanging signals between an arbitrary main channel and an arbitrary dependent channel with a small signal exchange capacity. In the add/drop multiplexer apparatus, add/drop multiplexer units are respectively provided for four different dependent connection ports in a communication network including an SDH transmission line having four main channels. Only one pair of the four main channels passes through a time slot mutual exchange unit possessed by the add/drop multiplexer unit, while the remaining main channels bypasses it. Another pair of the main channels passes through another time slot exchange unit. However, also in the add/drop multiplexer apparatus, when communication is performed between two different points, the communication between the two points occupies an SDH transmission line, thereby making it impossible to effectively use unused bands in total bands of the SDH transmission line, if any.

In JP, A, 08-008949, proposed is an SDH2-fiber ring optical multiplexing apparatus for selectively limiting the number of protection channels especially at the occurrence of a communication failure to increase available bands at normal operation. Specifically, a transmit/receive control unit for controlling transmission/reception of a predetermined channel signal allocates different number of channels such that the number of protection channels is limited with respect to the number of working channels on an optical fiber transmission path for increasing available bands at normal operation of a network. However, the optical multiplexing apparatus increases available bands only when a communication failure occurs. Additionally, also in the optical multiplexing apparatus, an SDH transmission line is basically occupied by communication between two points, thereby failing to effectively utilize unused bands in total bands of the SDH transmission line.

In JP, A, 09-511624 which corresponds to WO95/20846, proposed is an SDH add/drop multiplexer provided with a bypass and arranged to interface to a high bit rate transmission system through the bypass in use. Also in this add/drop multiplexer, as is the case with the apparatus disclosed in the aforementioned JP, A, 07-170238, when communication is performed between two different points, an SDH transmission line is occupied by the communication between the two points. For this reason, unused bands in total bands of the SDH transmission line, if any, can not be effectively used.

In addition, JP, A, 10-224390 proposes a signal switching method for addressing failures on a network. The signal switching method involves branching a signal to be switched into a plurality of signals A at a transmitting end and then transmitting the signals, receiving the signals A as a plurality of reception signals at a receiving end, and switching to a signal of the plurality of reception signals that is close to normal. A through signal not subjected to drop is processed in one package in a closed manner, while only a signal to be dropped is transferred to a package on the drop side for switching. For a signal to be added, a signal is branched from a package on the add side with a backboard and sent to another route. Also with the signal switching method, when communication is performed between two different points, an SDH transmission line is basically occupied by the communication between the two points. As a result, unused bands in total bands of the SDH transmission line, if any, can not be effectively used.

SUMMARY OF THE INVENTION

It is a first object of the present invention to provide a multi-access method capable of effectively using unused bands in total bands of an SDH path, if any, when communication is performed between two different points through the SDH path.

It is a second object of the present invention to provide a multi-access apparatus capable of effectively using unused bands in total bands of an SDH path, if any, when communication is performed between two different points through the SDH path.

In the present invention, when multi-access is performed to a synchronous digital hierarchy path, packets or cells are multiplexed in the synchronous digital hierarchy path to share one synchronous digital hierarchy path among a plurality of communications. This enables effective and efficient use of bands of the synchronous digital hierarchy path.

In the present invention, term "SDH" or "synchronous digital hierarchy", includes any kinds of digital hierarchy of synchronous type. For example, "synchronous digital hierarchy" to which the present invention can be applied includes synchronous digital hierarchy standardized by ITU-T, SONET (Synchronous Optical Network), and synchronous digital hierarchy defined by Bellcore GR-253. Further, term "SDH path" is used as its widest meaning and an SDH path can be used for a dedicated line as well as for a path for multiplexed packets.

The above and other objects, features, and advantages of the present invention will become apparent from the following description referring to the accompanying drawings which illustrate examples of preferred embodiments of the present invention.

DESCRIPTION OF THE PREFERRED EMBODIMENTS

First, a conceptual embodiment will be described for a multi-access transmission method based on the present invention.

Figure 3:
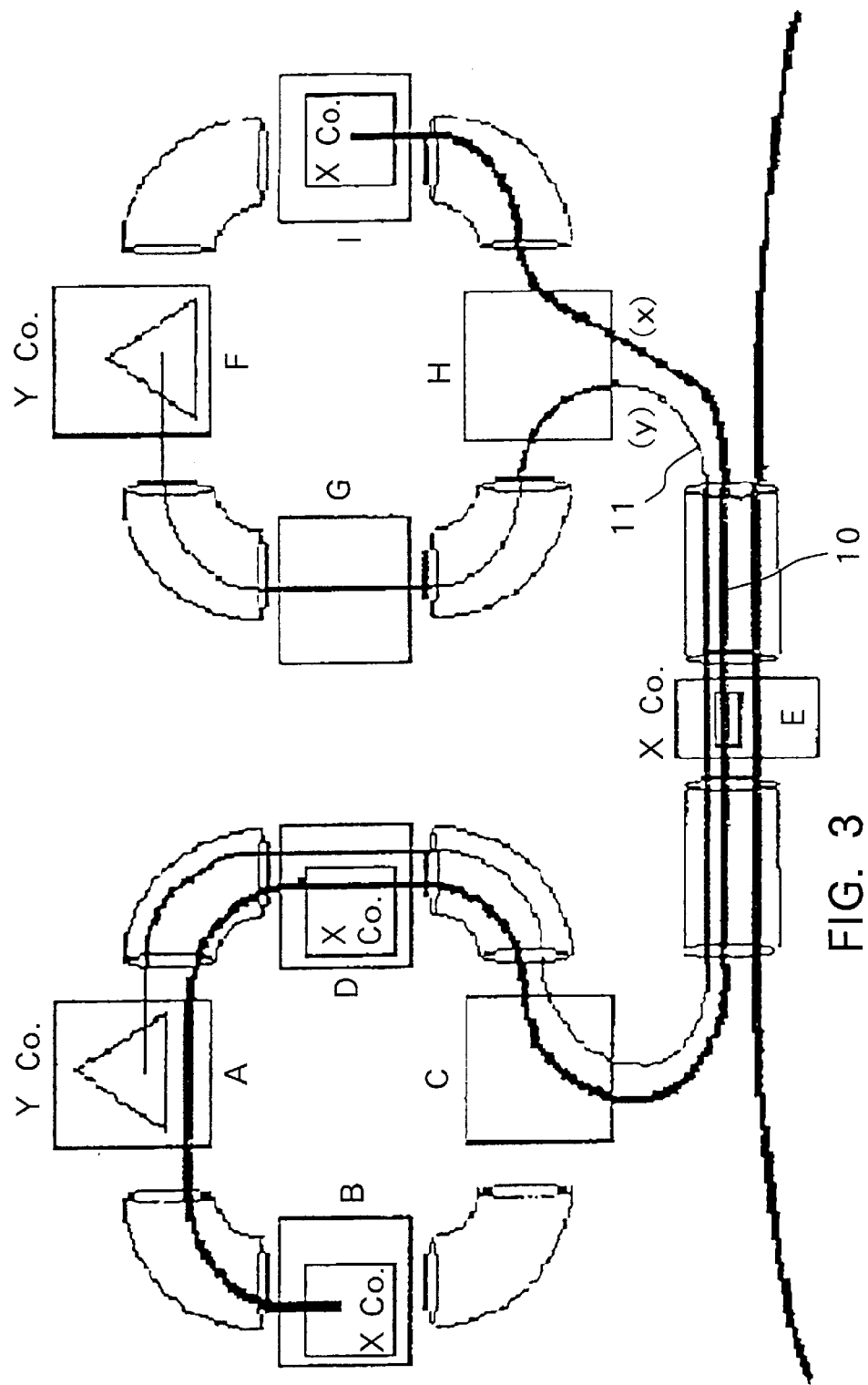
FIG. 3 is a schematic diagram showing principles of a multi-access transmission apparatus according to the present invention.

Assume herein that, as shown in FIG. 3, X company has offices at four points B, D, E and I, and that SDH path 10 which is dedicated line (x) passes through the points in the order of B point, A point, D point, C point, E point, H point and then I point. In other words, SDH path 10 of dedicated line (x) passes all of the four offices B, D, E and I of X company. Also assume that Y company has offices at two points A and F and that SDH path 11 which is a dedicate line (y) passes through A point, D point, C point, E point, H point, G point, and F point. In other works, SDH path 11 of dedicated line (y) passes the two offices A and F of Y company. In FIG. 3, the offices of X company are designated rectangular symbols, while the offices of Y company are designated triangular symbols. SDH path 11 of dedicate line (y) is a dedicated line of conventional type point-to-point connection. For this reason, access can not be made to SDH path 11 of dedicated line (y) from, for example, D point or E point which are halfway points.

On the other hand, SDH path 10 of dedicated line (x) is a dedicated line formed in accordance with the present invention. For this reason, access can be made to SDH path 10 of dedicated line (x) from D point and E point which are halfway points. In other words, according to the present invention, it is possible to access one SDH path at a plurality of points, i.e. to perform multi-access of multipoint-to-multipoint, and one SDH path can be shared among a plurality of communications. SDH path 10 of dedicated line (x) is hereinafter referred to as a shared SDH path.

In this case, SDH path 10 of dedicated line (x) and SDH path 11 of dedicated line (y) can coexist on the same network.

As described above, according to the present invention, a plurality of communication paths can be established in one SDH path (for example, SDH path 10 of dedicated line (x) shown in FIG. 3) with multi-access to the SDH path. Referring to the example shown in FIG. 3, it is possible to perform both communication between B–D points and communication between B–I points through the same dedicated line, i.e. SDH path 10 of dedicated line (x).

In this manner, according to the present invention, a plurality of communication paths are established in one SDH path to share the SDH path, thereby allowing an extreme reduction in bands required for each communication path to provide an inexpensive communication path while maintaining high reliability and quality.

Additionally, broadcast and multicast can be easily realized by applying a "Drop and Continue" function of an SDH path.

Application to Ring Type Transmission Path

Figure 4:
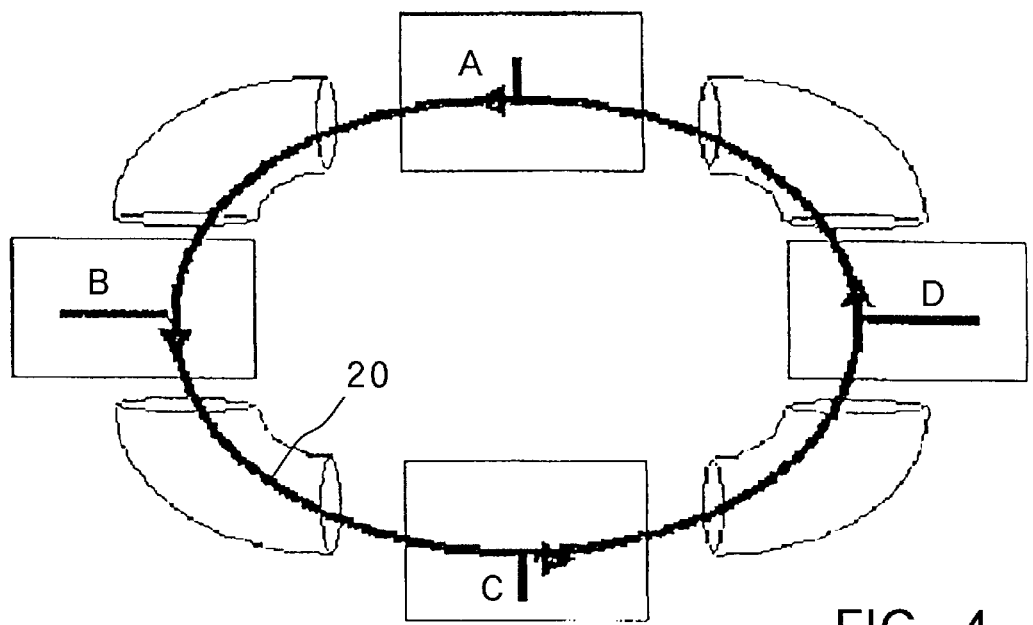
FIG. 4 is a schematic diagram showing a configuration of a multi-access transmission apparatus applied to a ring type network.

FIG. 4 shows an example of a configuration of a multi-access transmission apparatus based on the present invention intended for a ring type transmission path. In the multi-access transmission apparatus, shared SDH path 20 passes four points (A point, B point, C point and D point). In the transmission apparatus, when transmission is performed from each of the four points A, B, D and D to another arbitrary point, packets or cells are multiplexed in shared SDH path 20 to share one SDH path 20 among a plurality of communications.

This enables all of communication between A point–B point, communication between A point–C point, communication between A point–D point, communication between B point–C point, communication between B point–D point, and communication between C point–D point, through only one SDH path 20. In this manner, according to the multi-access transmission apparatus, communication between arbitrary two points of a plurality of points can be performed by providing only one SDH path.

Figure 5:
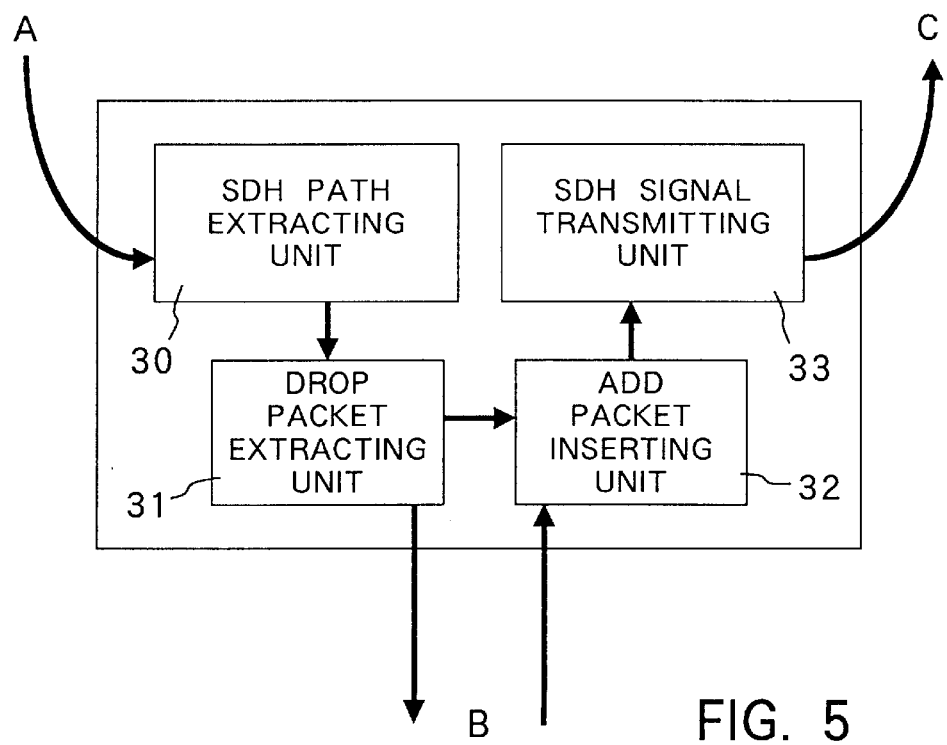
FIG. 5 is a block diagram showing an example of a specific configuration of the multi-access transmission apparatus applied to a ring type transmission path.

FIG. 5 is a block diagram showing an example of a specific configuration of the multi-access transmission apparatus applied to a ring type transmission path. FIG. 5 shows a left half of the ring type transmission path shown in FIG. 4, and specifically illustrates an apparatus provided at B point.

The multi-access transmission apparatus shown in FIG. 5 comprises SDH path extracting unit 30, drop packet extracting unit 31, add packet inserting unit 32, and SDH signal transmitting unit 33. SDH path extracting unit 30 has a function of converting optical signals inserted from A point into electric signals to extract an SDH path. SDH path extracting unit 30 divides optical signals to VT1.5 level (VT=virtual tributary) and selects necessary timeslots. Drop packet extracting unit 31 has a function of recognizing all packets inserted from A point to select a packet or packets to be dropped at B point. Add packet inserting unit 32 has a function of multiplexing both packets transmitted from drop packet extracting unit 31 and a packet or packets newly inserted at B point at a packet level. SDH signal transmitting unit 33 has a function of inserting signals transmitted from add packet inserting unit 32 into a corresponding timeslot at VT1.5 level in accordance with an SDH frame format. SDH signal transmitting unit 33 then converts the electric signals into optical signals for output to C point.

The multi-access transmission apparatus shown in FIG. 5 operates as follows.

The signals inserted into the SDH path from A point are transmitted to SDH path extracting unit 30 and a corresponding timeslot in an SDH frame is selected. The extraction is performed at VT1.5 path level in the multi-access transmission apparatus.

Next, drop packet extracting unit 31 recognizes all the packets stored in the VT1.5 path extracted at SDH path extracting unit 30 and identifies a packet or packets to be dropped at B point. The identified packet is dropped by drop packet extracting unit 31, while the other packets directed toward C point are transmitted from drop packet extracting unit 31 to add packet inserting unit 32 without processing.

A packet or packets to be newly inserted for transmission from B point to C point are transmitted to add packet inserting unit 32. Add packet inserting unit 32 combines the packet or packets to be added with the packets transmitted from A point to perform packet multiplexing.

Thereafter, in SDH signal transmitting unit 33, the packets are inserted into a corresponding timeslot to reconfigure an SDH frame which is then transmitted to C point.

With the aforementioned processing, the SDH path at VT1.5 allows multi-access at three points of A, B and C, and serves as a shared SDH path for accommodating all of communications between A–B points, A–C points, and B–C points.

Needless to say, in the multi-access transmission apparatus shown in FIG. 5, instead of extracting, dropping, inserting and multiplexing packets, cells may be extracted, dropped, inserted and multiplexed. In the context of the present invention, packets are equivalent to cells. While description will be hereinafter made for packets, the same discussion holds true for cells.

Shared SDH Path

With the multi-access transmission apparatus arranged as described above, a plurality of communication paths can be established in one SDH path to share the SDH path. This allows an extreme reduction in bands required for each communication path to efficiently use the bands. As a result, an inexpensive communication path can be provided.

Figure 1A:
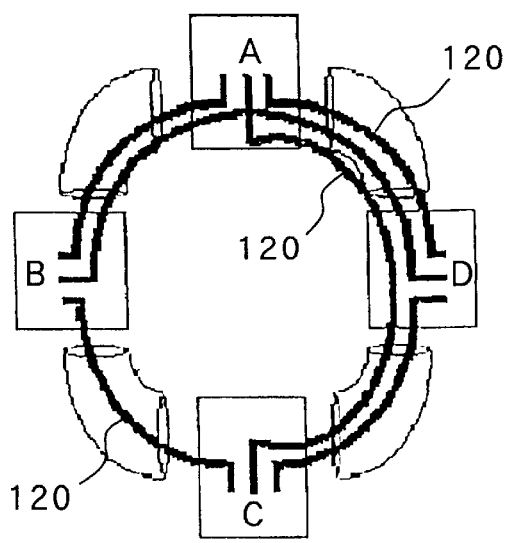
FIGS. 1A and 1B are schematic diagrams showing conventional connection among LANs of mesh type and Hop by Hop type, respectively.
Figure 1B:
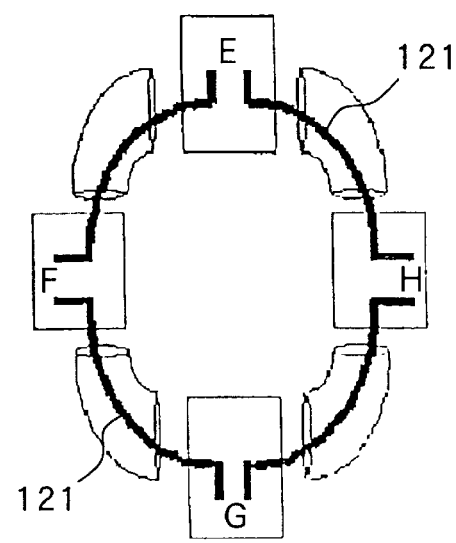
Figure 2:
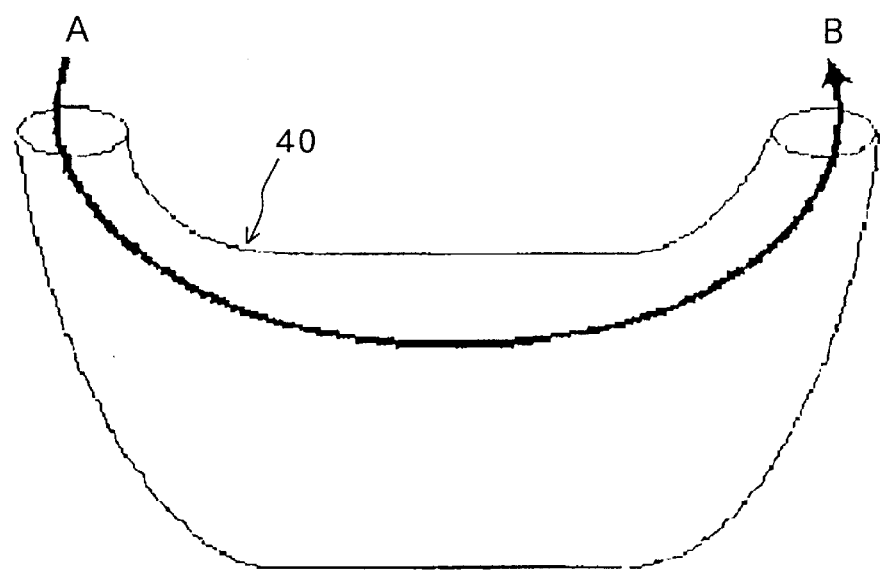
FIG. 2 is a diagram showing a form of a conventional SDH path.

For example, when communication is performed connecting A point to B point, as shown in FIG. 2 described above, SDH path 40 connecting the two points is conventionally provided and occupied by the communication between A point–B point. In this case, the bands of SDH path 40 are always provided for communication between A point–B point. Therefore, unused bands in total bands of SDH path 40, if any, can not be effectively used, resulting in inability to efficiently use the bands.

Figure 6:
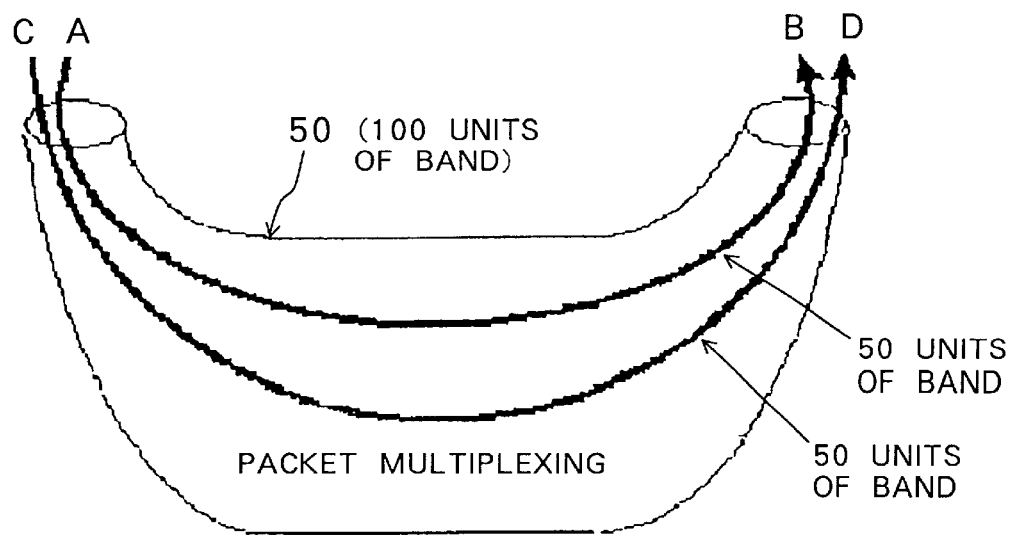
FIG. 6 is a diagram showing a form of a shared SDH path.

On the other hand, as shown in FIG. 6, assume that each of communication connecting A point to B point and communication connecting C point to D point is performed through SDH path 50. With the SDH path being shared as in the multi-access transmission apparatus shown in FIGS. 4 and 5, when the communication between A point and B point does not occupy all of the bands of SDH path 50, unoccupied bands of SDH path 50 can be used for the other communications (in this case, communication between C point and D point) by performing packet multiplexing. For example, assuming that 100 units of band are provided for SDH path 50, 50 units of band of them can be used for the communication between A point and B point and the remaining 50 units of band can be used for the communication between C point and D point. In other words, SDH path 50 is shared between the communication between A point and B point and the communication between C point and D point.

Figure 7:
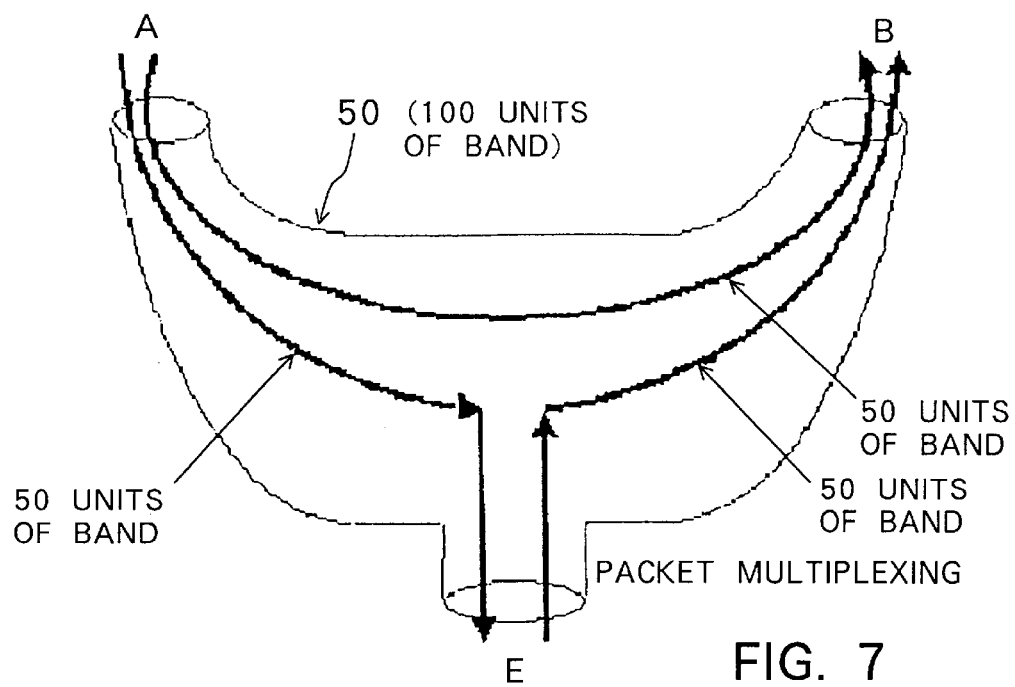
FIG. 7 is a diagram showing another form of the shared SDH path.

Also, as shown in FIG. 7, even when E point exists at an intermediate point between A point and B point, it is possible to perform communication sharing SDH path 50 among three points A, B and E. Specifically, assuming 100 units of band are provided for SDH path 50, 50 units of band of them can be used for the communication between A point and B point, and the remaining 50 units of band for each of the communication between A point and E point and the communication between E point and B point.

In this manner, SDH path 50 can be shared among the communication between A point and B point, the communication between A point and E point, and the communication between E point and B point.

SDH Path with Multiplexed and Mapped Packets

Figure 8:
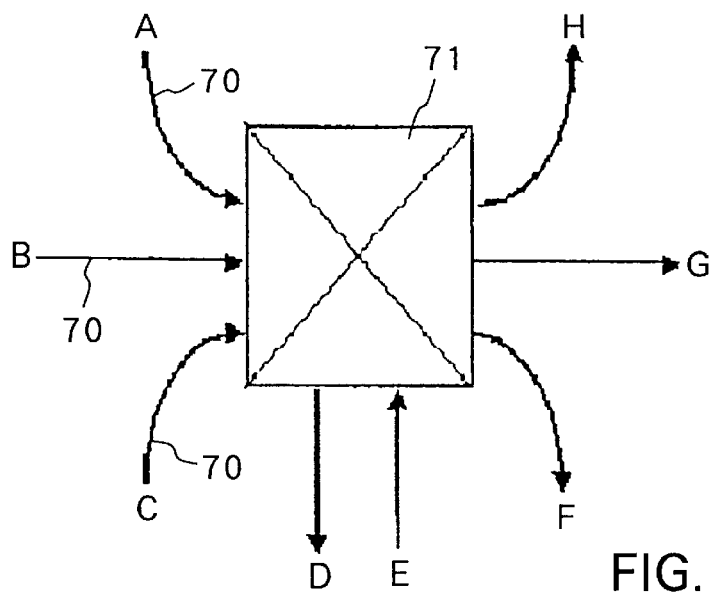
FIG. 8 is a diagram showing a crossconnect of the shared SDH path.

Additionally, according to the multi-access transmission apparatus of the present embodiment, once packets are multiplexed and mapped to an SDH path, the path can be handled as a pure SDH path. For example, as shown in FIG. 8, crossconnector 71 is used to perform crossconnect for shared SDH paths as one path, thereby facilitating crossconnection at a path level with multiplexed packets.

Figure 9:
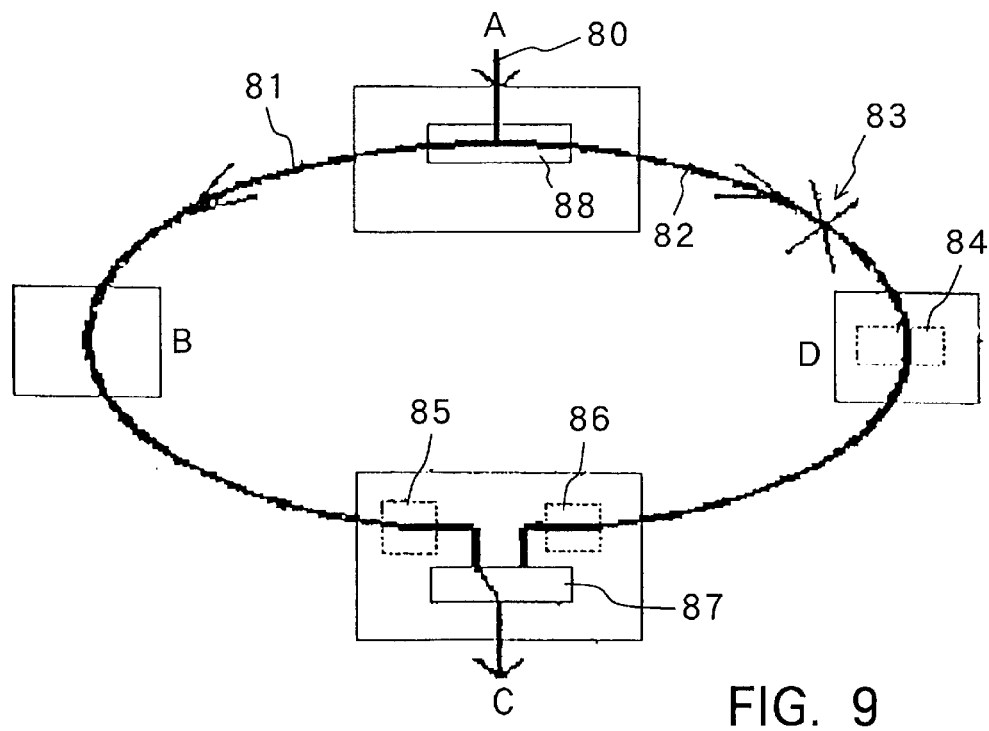
FIG. 9 is a diagram showing fault protection of the shared SDH path.

As shown in FIG. 9, fault protection can be easily performed at a path level with multiplexed packets by performing fault protection for an SDH path. FIG. 9 shows a case where signal 80 input from A point is transmitted to C point. Signal 80 is branched at A point with bridge 88 into signal 81 directed toward B point and signal 82 directed toward D point.

Assume herein that fault 83 occurs at a position between A point and D point to damage signal 82. In this case, an alarm generation signal is inserted into signal 82 with, for example, alarm generation signal inserting unit 84 at D point.

Alarm generation signal detecting units 85, 86 at C point which is a destination of transmission monitor signals 81, 82 input through different routes for their normality. In this case, alarm generation signal detecting unit 86 detects the alarm generation signal inserted into signal 82. Selector 87 at C point originally selects signal 82, but automatically switches to reception of signal 81 in response to the detection of the alarm generation signal in signal 82 by alarm generation signal detecting unit 86.

In this manner, protection of the SDH path can be easily performed at a packet level with multiplexed packets.

Physical Separation from Another SDH Path

According to the multi-access transmission apparatus of the present embodiment, once packets are multiplexed and mapped to an SDH path, the path can be handled as a path physically separated from other SDH paths.

Figure 10:
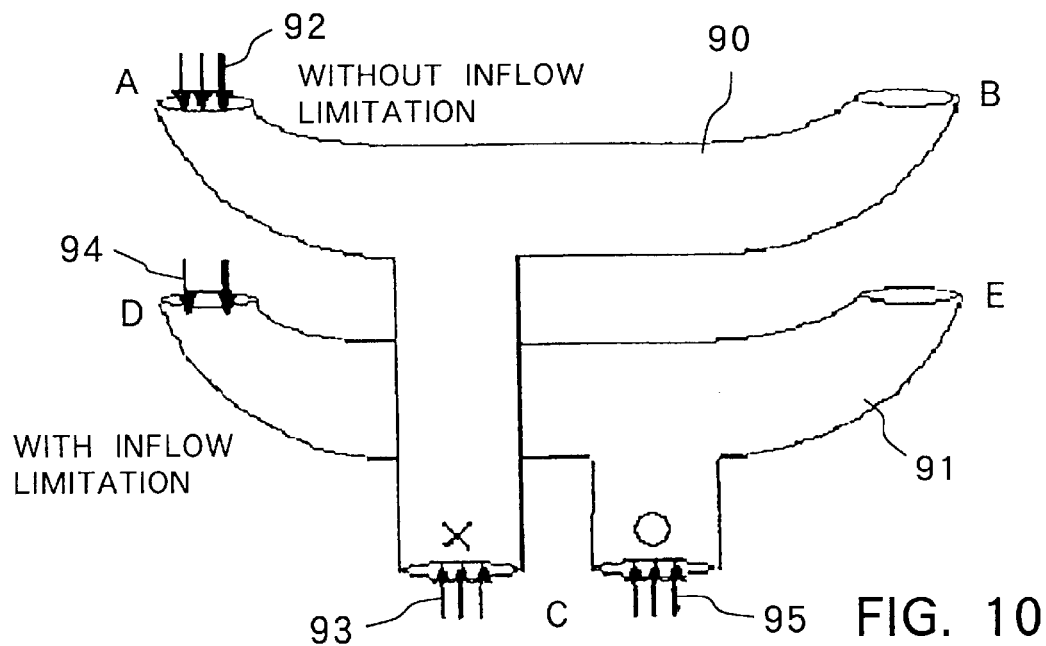
FIG. 10 is a diagram showing an SDH path not subjected to band limitation and an SDH path subjected to band limitation.

FIG. 10 shows an example in which first shared SDH path 90 is a path not subjected to band limitation, while second shared SDH path 91 is a path subjected to band limitation.

At A point, when packets 92 are inserted into first SDH path 90 with no limitation of packet inflows to almost the full capacity of bands thereof, new packets 93, if attempted, may not be inserted into first SDH path 90 from C point, or excessive packets 92 transmitted from A point may be lost.

On the other hand, second SDH path 91 is subjected to band limitation and inflow limitation for rejecting insertion of excessive packets 94 at D point. This allows insertion of packets 95 from C point into second SDH path 91, and avoids unintentional loss of packets transmitted from A point. No packet moves between first SDH path 90 and second SDH path 91 and both SDH paths 90, 91 do not interfere with each other in such situations.

With such a configuration, it is possible to set definition of a plurality of QoS (Quality of Service) classes such that, for example, first SDH path 90 is of best effort type and second SDH path 91 is of priority control type, thereby making it possible to support various SLAs (Service Level Agreements) and to define and ensure reliability and quality of a plurality of classes. QoS class for each SDH path can be individually ensured, and at the same time, since SDH path 90 and SDH path 91 are completely closed with respect to each other, security is respectively ensured. Security between SDH paths can be also completely realized.

The use of an SDH path as described above causes the SDH path itself to serve as a CUG (Closed User Group). Thus, IP (Internet Protocol) addresses are also closed in the CUG and private addresses can be used. Specifically, the same IP address can be used in different SDH paths to allow effective use of an IP address.

Broadcast and Multicast

According to the multi-access transmission apparatus of the aforementioned embodiment, once packets are multiplexed and mapped to an SDH path, broadcast and multicast can be realized using "Drop and Continue" function of the SDH path.

Figure 11:
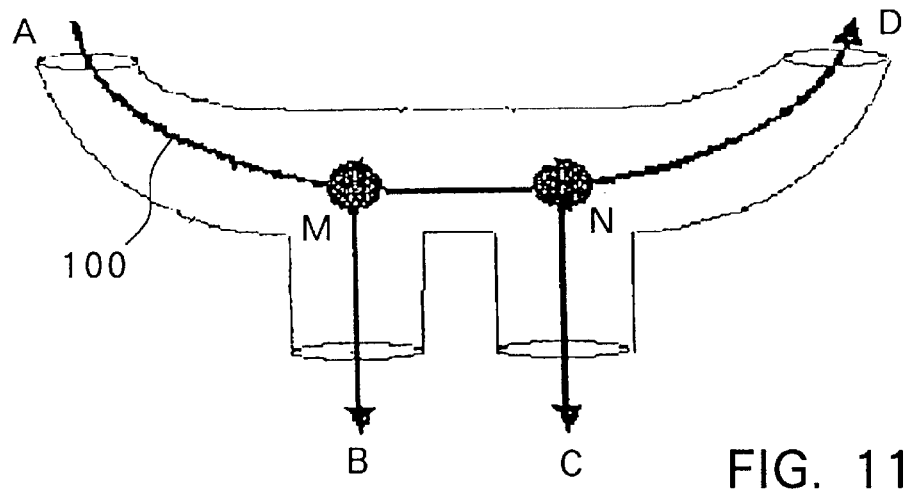
FIG. 11 is a diagram for explaining an example of multicast using an SDH path.

FIG. 11 shows an example of multicast using an SDH path. As shown in FIG. 11, when communication is performed between A point and D point through SDH path 100, "Drop and Continue" can be performed at intermediate points, i.e. M point and N point at an SDH path level to acquire the same signal at B point corresponding to M point and at C point corresponding to N point. As a result, broadcast or multicast can be easily realized.

Application to Linear Type Transmission Path

While the aforementioned embodiment shows application of the multi-access transmission apparatus of the present invention to a ring type transmission path, the present invention is not limited thereto. Description is now made for application of the multi-access transmission path of the present invention to a linear type transmission path.

Figure 12:
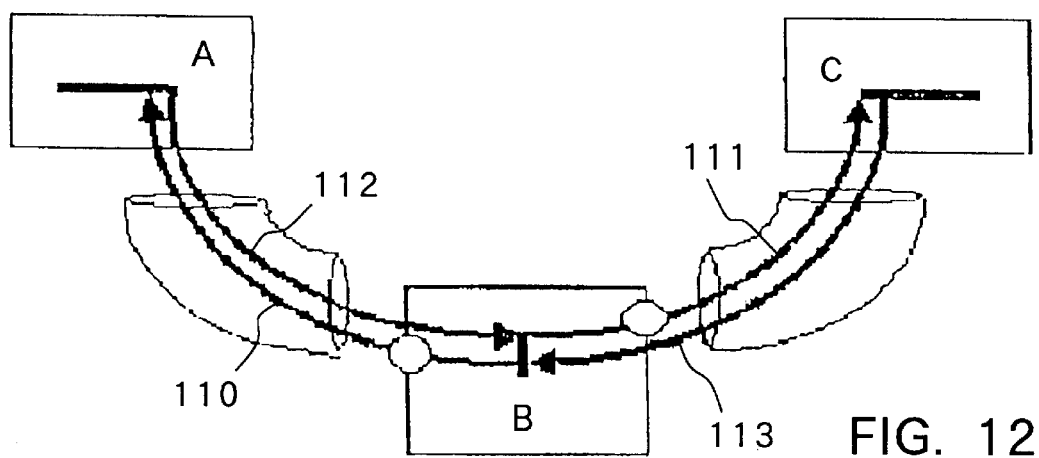
FIG. 12 is a schematic diagram showing a configuration of a multi-access transmission apparatus applied to a linear type network.

A multi-access transmission apparatus shown in FIG. 12 is provided with, as transmission paths of linear type, first transmission path 110 extending from B point to A point, second transmission path 111 extending from B point to C point, third transmission path 112 extending from A point to B point, and fourth transmission path 113 extending from C point to B point. All transmission paths 110 to 113 are shared SDH paths.

In the case of the ring type transmission path shown in FIG. 4, since an inserted SDH path inevitably passes through all of points A, B, C and D, an inserted packet may be carried on a single specific transmission path regardless of its destination. FIG. 4 shows a counterclockwise ring, and for example, all of a packet from A point to B point, a packet from A point to C point, and a packet from A point to D point may be carried on the SDH path of the same direction. Thereafter, the packet may be subjected to drop processing at each point as required. A clockwise ring path, if any, is used as a backup system for performing fault protection.

In contrast, in the case of the linear type transmission path shown in FIG. 12, two transmission paths are required at B point, i.e. first transmission path 110 toward A point from B point and second transmission path 111 toward C point from B point. Thus, a functional block for unidirectional transmission in the multi-access transmission apparatus whose specific configuration is shown in FIG. 5 is provided "bi-directionally" (i.e. two blocks are provided), thereby allowing application to a halfway node in the linear type transmission path.

In the multi-access transmission path shown in FIG. 5, input signals are divided to VT1.5 and a necessary timeslot is selected at the level. Other than the VT1.5, VT2, VT3, VT6, STS-1, STS-3 (STM-1) (STS=Synchronous Transport Signal, STM=Synchronous Transport Module), STS-12 (STM-4), STS-48 (STM-16) or STS-192 (STM-64) may be used. Additionally, the entirety may be a single band type, or VT1.5 and STS-1 may be mixedly used. The transmission rate of the above paths are indicated in Table 1.

TABLE 1

| Path | Transmission rate |
|---|---|
| VT1.5 | 1.728 Mbps |
| VT2 | 2.304 Mbps |
| VT3 | 3.456 Mbps |
| VT6 | 6.912 Mbps |
| STS-1 | 51.840 Mbps |
| STS-3 (STM-1) | 155.520 Mbps |
| STS-12 (STM-4) | 622.080 Mbps |
| STS-48 (STM-16) | 2488.320 Mbps |
| STS-192 (STM-64) | 9953.280 Mbps |

In addition to variations in different types of bands in an SDH path, they may be used in combination. Specifically, (1) method of collecting n of the same band type, (2) method of merging different band types, or (3) a combination of these two methods is used. Thus, timeslots may be arbitrarily combined and used as a "service unit".

Specifically, according to the present invention, a plurality of different "services" can be provided on the same transmission network. The "services" include QoS, security, protection, CUG (IP address), and multicast, as described above, and various "levels" and "types" are contemplated therefor.

For example, they include high QoS services and low QoS services, high security services and low security services, high reliable services for which a backup is always prepared and low reliable services for which a backup is prepared after a fault occurs, several CUG services, several multicast services, or a combination thereof.

Each of them may be a "service unit". Each of them is managed as one service unit, and in terms of band, timeslots may be arbitrarily combined to allow flexible arrangement and transmission.

While all the aforementioned embodiments relate to packets and multiplexing thereof, cells may be used and multiplexed instead of packets.

While the aforementioned embodiments relate to an SDH path, a PDH (Plesiochronous Digital Hierarchy) path or WDM (Wavelength Division Multiplex) path may be used instead of the SDH path. When the present invention is applied to a PDH path, "SDH path" and "SDH signal" in the aforementioned description will be replaced with "PDH path" and "PDH signal", respectively. Similarly, when the present invention is applied to a WDM path, "SDH path" and "SDH signal" in the aforementioned description will be replaced with "wavelength path" and "wavelength signal", respectively.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A method of multi-access transmission for performing multi-access to a synchronous digital hierarchy path to fully utilize unused bands in a total of number of bands of said path, said method comprising:

sharing one multi-access synchronous digital hierarchy (SDH) path among a plurality of communications by multiplexing packets or cells in the synchronous digital hierarchy path, wherein said packets or cells to be newly multiplexed are fitted into said SDH path based upon determining which bands of said SDH path remain open after any of arriving packets or cells have been newly dropped and filling any unused bands, up to a possible total number of bands in said SDH path.

2. A method of multi-access transmission to fully utilize all possible bands in a transmission path, said method comprising:

extracting a synchronous digital hierarchy (SDH) path from signals input from a first point, said SDH path having a predetermined number of total possible transmission bands;

recognizing packets or cells input from the first point to select and drop a packet or cell to be dropped at a second point; and multiplexing packets or cells not dropped and a packet or cell to be inserted at the second point at a packet or cell level into one of said total possible transmission bands remaining open, if any, after any of said packet or cell is dropped at said second point; and sending signals representing said multiplexed packets or cells created at said multiplexing to a third point.

3. A method according to claim 2, wherein said extracting includes converting optical signals input from the first point into electrical signals and then extracting the synchronous digital hierarchy path from the electrical signals.

4. A method according to claim 2, wherein said sending includes converting the signals created at said multiplexing into optical signals and sending the optical signals to the third point.

5. A method according to claim 2, wherein all packets or cells input from the first point are recognized in the recognizing packets or cells.

6. A method according to claim 2, wherein the dropped packet or cell is acquired from the second point with a synchronous digital hierarchy path.

7. A method according to claim 2, wherein the packet or cell to be inserted is provided to the second point with a synchronous digital hierarchy path.

8. A method of multi-access transmission for performing multi-access to a plesiochronous digital hierarchy path, comprising:

sharing one plesiochronous digital hierarchy path among a plurality of communications by multiplexing packets or cells in the plesiochronous digital hierarchy path, wherein newly-added packets or cells to be multiplexed are fitted into remaining transmission bands up to a total number of possible transmission bands in said plesiochronous digital hierarchy path.

9. A method of multi-access transmission for performing multi-access to a wavelength division multiplex path, comprising:

sharing one wavelength division multiplex path among a plurality of communications by multiplexing packets or cells in the wavelength division multiplex path, wherein newly-added packets or cells to be multiplexed are fitted into remaining transmission bands up to a total number of possible transmission bands in said wavelength division multiplex path.

10. A multi-access transmission apparatus, comprising:

extracting means for extracting a digital hierarchy path from signals input from a first point;

drop means for recognizing packets or cells input from the first point through said extracting means to select and drop a packet or cell to be dropped at a second point;

inserting means for multiplexing packets or cells not dropped by said drop means and a packet or cell to be inserted at the second point at a packet or cell level of transmission bands remaining open after packets or cells are dropped at said second point, up to a point where all of a total number of possible transmission bands in said digital hierarchy path are filled; and sending means for sending signals representing said multiplexed packets or cells created at said inserting means to a third point.

11. An apparatus according to claim 10, wherein the digital hierarchy path comprises a synchronous digital hierarchy path.

12. An apparatus according to claim 11, wherein all packets or cells input from the first point are recognized by the drop means.

13. An apparatus according to claim 11, wherein the signals input from the first point comprise optical signals, and said extracting means includes means for converting the optical signals into electrical signals and extracting a path of synchronous digital hierarchy from the electrical signals.

14. The multi-access transmission apparatus according to claim 11, wherein the signals created at said inserting means comprise electrical signals, and said sending means includes means for converting the electrical signals into optical signals and sending the optical signals to the third point.

15. The method of claim 1, further comprising:

extracting said synchronous digital hierarchy path from signals input from a first point;

recognizing one of packets and cells input from the first point to select and drop one of a packet and a cell to be dropped at a second point; and multiplexing one of said packets and said cells not dropped and one of a packet and a cell to be inserted at the second point at one of a packet level and a cell level.

16. The method of claim 8, further comprising:

extracting said plesiochronous digital hierarchy path from signals input from a first point;

recognizing one of said packets and said cells input from the first point to select and drop one of a packet and a cell to be dropped at a second point; and multiplexing one of said packets and said cells not dropped and one of a packet and a cell to be inserted at the second point at one of a packet level and a cell level.

17. The method of claim 9, further comprising:

extracting said wavelength division multiplex path from signals input from a first point;

recognizing one of said packets and said cells input from the first point to select and drop one of a packet and a cell to be dropped at a second point; and multiplexing one of said packets and said cells not dropped and one of a packet and a cell to be inserted at the second point at one of a packet level and a cell level.

18. A multi-access transmission apparatus, comprising:

a synchronous digital hierarchy (SDH) path extracting unit for extracting a digital hierarchy path from signals input from a first point;

a drop packet inserting unit for recognizing one of packets and cells input from the first point through said extracting means to select and drop one of a packet and a cell to be dropped at a second point;

an add packet inserting unit for multiplexing one of said packets and said cells not dropped by said drop packet inserting unit and one of a packet and a cell to be inserted at the second point at one of a packet level and a cell level at one of a band position remaining open, if any, in a total possible number of bands in said SDH oath after any packet or cell has been dropped at said second point; and an SDH signal transmitting unit for sending said multiplexed one of said packets and said cells created at said add packet inserting unit over at least one of a plurality of communication bands within said synchronous digital hierarchy path to a third point.

19. The method of claim 1, further comprising:

providing a plurality of distinct SDH paths for providing a plurality of quality of service classes.

20. The method of claim 1, further comprising:

providing an alarm generation signal detecting unit to detect an alarm generation signal that is generated upon a fault in said SDH path; and providing a branch in said SDH path with a bridge as an alternative SDH path upon detection of said alarm generation signal.

21. The method of claim 1, further comprising:

transmitting said plurality of communications over a plurality of communication bands within said one SDH path among a plurality of points on a network, wherein said one SDH path comprises a pure SDH path.

22. The method of claim 8, further comprising:

transmitting said plurality of communications over a plurality of communication bands within said one plesiochronous digital hierarchy path among a plurality of points on a network.

23. The method of claim 9, further comprising:

transmitting said plurality of communications over a plurality of communication bands within said one wavelength division multiplex path among a plurality of points on a network.

* * * * *